3,440,517
CIRCUIT EMPLOYING SILICON CONTROLLED
RECTIFIERS FOR REGULATING THE RMS
VALUE OF AN A.C. SIGNAL ACROSS A
LOAD
Archer G. Page, Fremont, and Alan W. Carter, Newark, Calif., assignors to Beckman Instruments, Inc., a corporation of California
Filed June 17, 1966, Ser. No. 558,477
Int. Cl. H02m 5/06; H05b 41/36
U.S. Cl. 321—18                                    10 Claims

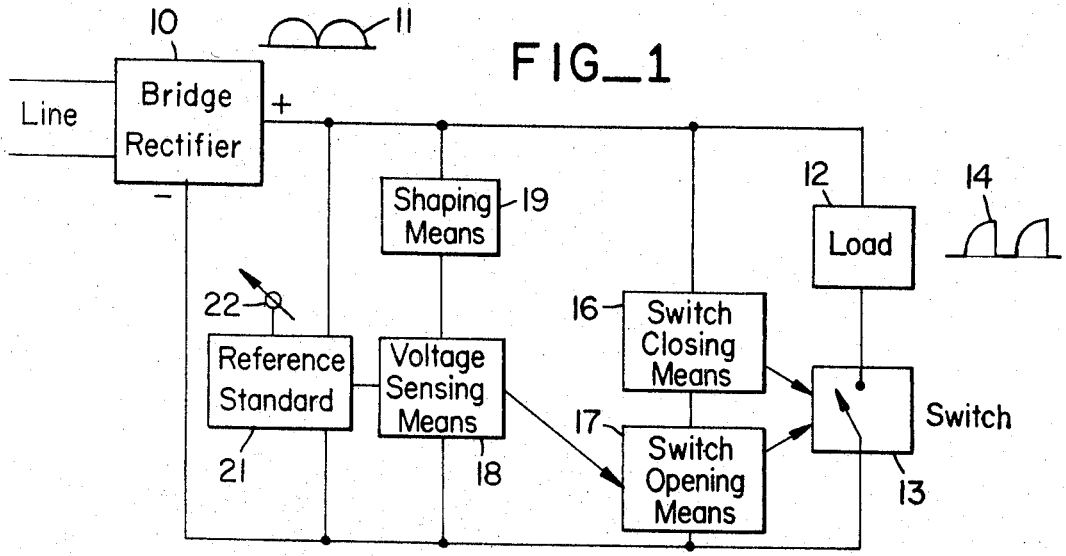
FIG_1
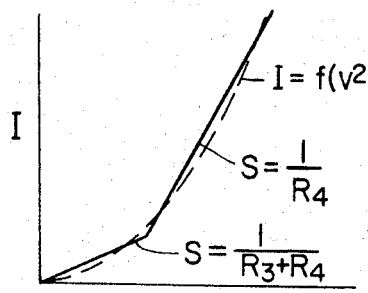
FIG_3
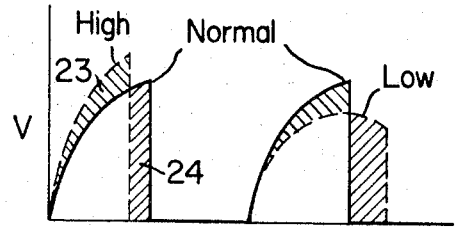
FIG_4
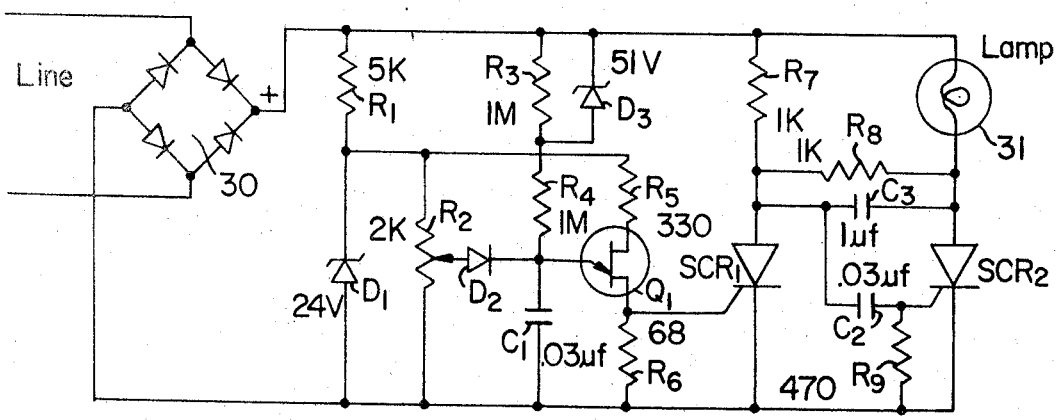
FIG_2
INVENTORS
ARCHER G. PAGE
ALAN W. CARTER
BY
ATTORNEYS United States Patent Office 3,440,517
Patented Apr. 22, 1969

ABSTRACT OF THE DISCLOSURE

A circuit for regulating the RMS value of an A.C. signal across a load including a first silicon controlled rectifier which is triggered at the beginning of each half cycle of the signal to couple the load to the A.C. signal source and a second silicon controlled rectifier which is triggered at a predetermined time at each half cycle of the signal to effectively decouple the load from the A.C. signal source. The second control rectifier is triggered by a gating signal provided by a combination of a shaping means which produces a signal having an amplitude which is a function of the square of the A.C. signal being regulated and a voltage sensing means which produces a gating signal when the output signal of the shaping means reaches a predetermined voltage level.

---

The present invention relates to a voltage regulator, and more specifically to a regulator utilizing a full wave rectified AC voltage for maintaining a predetermined value of voltage across a load in spite of fluctuations of the AC line voltage.

The precise maintenance and regulation of a voltage across a load is necessary in many applications; for example, in a densitometer device which utilizes a lamp for illuminating a sample, the luminous intensity of the lamp must be precisely maintained at a constant level during the measurement procedure. To achieve this, fluctuations of the line voltage either above or below its normal value must be compensated.

In the past, one method of voltage regulation has been the use of silicon controlled rectifiers where a type of phase control circuit is used in that initiation of conduction through the load is delayed by a certain angle so that the silicon controlled rectifier conducts only a predetermined portion of a half cycle. However, this is unsatisfactory in that the phase angle delay is determined by the preceding cycle of line voltage, and if this has changed in the meanwhile, the present regulation is inaccurate. However, the above arrangement, even assuming only a one cycle lag in adjustment, is intolerable since the circuitry necessary to attain a rapid response is expensive and impractical.

It is, therefore, a general object of the present invention to provide an improved voltage regulator.

It is another object of the invention to provide a voltage regulator which stabilizes the root means square value of the voltage across a load.

It is still another object of the invention to provide a voltage regulator of the above type which is simple and economical in construction.

Additional objects of the invention will appear from the following description in which the preferred embodiment of the invention has been set forth in detail in conjunction with the accompanying drawing.

Referring to the drawing:

FIGURE 1 is a block diagram embodying the invention;

FIGURE 2 is a detailed schematic circuit diagram of the block diagram of FIGURE 1;

FIGURE 3 is a curve useful in understanding the invention; and

FIGURE 4 illustrates different conditions of voltages across the load of the present invention.

The invention is shown in general format in FIGURE 1 where the line voltage, such as 117 volts AC, is rectified by a full wave bridge rectifier 10 as illustrated by its full wave signal output 11, and supplied to a series connected load 12 and switch 13 back to the nominal minus terminal of the bridge rectifier. The effective or root mean square (RMS) value of voltage across load 12 is regulated by opening switch 13 at a predetermined time during each half cycle of the rectified AC signal as illustrated by the resultant voltage (curve 14) across load 12.

A switch closing means 16 is coupled between the plus and minus terminals of bridge rectifier 10 and provides for the closing of switch 13 upon the application of the full wave rectified voltage 11 across load 12 at the beginning of a half cycle. A switch opening means 17 causes switch 13 to open at a predetermined time in the half cycle, as will be explained in greater detail later, to thereby provide voltage regulation across the load 12. Switch opening means 17 is actuated by and coupled to voltage sensing means 18, which is coupled to bridge rectifier 10 and senses the voltage magnitude of the output signal provided by shaping means 19, which is located intermediate the voltage sensing means 18 and the bridge rectifier 10. The shaping means 19 provides an output signal whose amplitude varies as a function of the square of the magnitude of the rectified AC signal derived from full wave rectifier 10.

More specifically, where as in the present specific embodiment, the load is a projection lamp, the luminous intensity of the lamp must be maintained at a constant value despite variations in line voltage. Since the luminous intensity is directly related to heating, the effective or root means square (RMS) value of voltage across the load must be maintained constant. This follows from basic electrical theory since the effective value of a periodically varying potential is defined as the magnitude of a constant potential which would produce heat in a given resistor at the same average rate that it is produced by the varying one. And, since the heating of the filament is related to the luminous intensity, the same average heating will maintain the same luminous intensity.

Still referring to FIGURE 1, the amount of effective voltage across the load may be adjusted by a reference standard 21 which is coupled between the plus and minus terminals of bridge rectifier 10 and is also coupled to voltage sensing means 18. Reference standard 21 includes an adjustment control 22 for determining the exact value of the desired effective potential across the load. The voltage sensing means 18 is coupled to the reference standard, and the use of the reference standard contributes to the determination of the period of time in the half cycle switch opening means 17 is actuated to open switch 13.

As mentioned above, in the specific embodiment of the present invention, it is desired to maintain the effective value of potential constant across the load regardless of varying line voltages. In FIGURE 4 the normal voltage across the load is indicated in full line, and the high and low line voltages in dashed line. The special characteristic of the shaping means 19 in conjunction with voltage sensing means 18 causes switch 13 to open, in the case of the higher than normal line voltage earlier than usual to provide the same effective value of voltage across the load. However, to achieve the same effective value, the additional magnitude of voltage supplied to the load indicated by the area 23 must be counter-balanced by a larger area 24. This follows in accordance with Equation 1 below which gives the effective value of a sine wave voltage.

$$V_{\text{eff}} = V_m \sqrt{\frac{1}{\pi} \int_0^t \sin^2 \omega t \, dt} \qquad (1)$$

Since area 23 is proportional to the magnitude value of voltage, $V_m$, it varies linearly as opposed to area 24 which varies in accordance with a non-linear time function as described by Equation 1. Thus, to maintain the same effective value of voltage across load 12, the switch 13 must be cut-off at a relatively earlier time than would normally be done if a linear relationship were present. Similarly where the line voltage drops below its normal value as shown in FIGURE 4, the area relationships are the same as in the previous case.

The present invention provides the relationship of Equation 1 by means of shaping means 19 which as illustrated by the dashed curve of FIGURE 3 shapes according to the equation $I=f(V^2)$. An integrating capacitor in voltage sensing means 18 then integrates the squared voltage.

Referring now to the specific details of the circuit schematic of FIGURE 2, the line voltage is applied across a full wave bridge rectifier 30, the plus terminal being coupled to a lamp load 31, with a silicon controlled rectifier switch $SCR_2$ completing the circuit back to the minus terminal. Means for closing $SCR_2$ include a resistor $R_7$ and a capacitor $C_2$ which are series connected between the gate terminal of the $SCR_2$ and the plus terminal of rectifier 30. When the line voltage starts to go positive, current is conducted through $R_7$ and $C_2$ and to the minus terminal through a resistor $R_9$ connected between the minus terminal and the triggering or gate terminal. The voltage across $R_9$ causes a triggering of $SCR_2$. $SCR_2$ will remain in a conduction mode until the current through it is reduced to a value below its holding current which is a parameter of the SCR itself.

The voltage reference standard includes a Zener diode $D_1$ which is coupled to the plus line through a resistor $R_1$ and has its anode coupled to the minus line. Assuming a line voltage of 117 volts, the Zener diode provides a constant voltage across it of 24 volts. This is placed across a parallel connected potentiometer $R_2$. Its moving contact is coupled to the emitter electrode of a unijunction transistor $Q_1$ through a series connected diode $D_2$.

$Q_1$ is a portion of the voltage sensing means of the circuit and has its two base electrodes coupled across the Zener diode $D_1$ by series connected resistors $R_5$ and $R_6$ respectively. The voltage sensing circuit also includes an integrating capacitor $C_1$ which has one side coupled to the minus line and the other side coupled to the emitter electrode of transistor $Q_1$, which emitter electrode is also coupled to the plus line by way of serially connected resistors $R_3$ and $R_4$. Resistor $R_3$ is paralleled by a Zener diode $D_3$ having a 51 volt breakdown point.

Zener diode $D_3$ and resistors $R_3$ and $R_4$ form the shaping circuit for the voltage sensing means as illustrated specifically in FIGURE 3. During the initial part of the plus one-half cycle of the rectified wave, the current to capacitor $C_1$ is determined, as far as the shaping circuit is concerned, by resistors $R_3$ and $R_4$. Thus, as illustrated in FIGURE 3, the current curve has a slope equal to the reciprocal of the sum of $R_3$ and $R_4$. The breaking point in the curve is determined by the 51 volt characteristic of Zener diode $D_3$ which essentially shorts out $R_3$, and thus the remainder of the current characteristic has a slope equal to the reciprocal of $R_4$. Thus, the shaping circuit provides an output signal whose amplitude is substantially proportional to the square of the magnitude of the rectified input signal.

Capacitor $C_1$ is, of course, also charged by current through the resistors $R_1$, $R_2$, and $D_2$. However, because of the breakdown characteristic of $D_1$ of 24 volts, this current provides merely a "pedestal" or base voltage on capacitor $C_1$ to which the shaped current through the shaping network $R_3$, $R_4$, $D_3$ provides an additional amount of current determined by the magnitude of the full wave rectified AC signal. When this additional current charges the capacitor up to a certain amount, the transistor $Q_1$ is fired. It is, of course, obvious that by adjustment of the sliding contact of potentiometer $R_2$, the pedestal or base voltage on capacitor $C_1$ will be raised or lowered, and thus the firing point of unijunction transistor $Q_1$ will be reached in less time or greater time, depending on the initial setting of potentiometer $R_2$.

The pulse output signal of transistor $Q_1$ is coupled to the gate terminal of a silicon controlled rectifier ($SCR_1$) which has its cathode terminal connected directly to the minus line and its anode terminal to the plus line through a resistor $R_7$. The anode terminal of $SCR_1$ is also coupled to the plus line by way of a resistor $R_8$ and lamp 31. Finally, the anode terminal of $SCR_1$ is coupled to one side of the capacitor $C_3$ and one side of capacitor $C_2$. The other side of capacitor $C_3$ is connected between lamp 31 and the anode terminal of $SCR_2$.

In operation, the activation of $SCR_2$ has already been explained which is due to the current through $R_7$, $C_2$ and $R_9$, caused by the rise of the rectified plus voltage. This will occur almost at zero time since the input terminal of $SCR_2$ fires at a relatively low input voltage; e.g. a voltage of .2 volt. The rising of the rectified voltage causes capacitor $C_1$ to charge, and, depending on the setting of the potentiometer control $R_2$, unijunction transistor $Q_1$ will fire at a predetermined point in the cycle. This in turn fires $SCR_1$ which, because of the now small voltage drop across $SCR_1$ places one side of capacitor $C_3$ almost at the minus potential, diverting current from $SCR_2$. When the current through $SCR_2$ falls below its holding current, it switches off. The charging of $C_3$ by this diversion of current now places the anode terminal of $SCR_2$ at a more negative voltage than its gate terminal, and thus during the remainder of the half cycle the retriggering of $SCR_2$ is not possible. However, $SCR_1$ still remains in a conducting mode until the rectified voltage has again dropped substantially to zero. The conduction of $SCR_1$ also causes a small current to be maintained through the lamp 31 through $R_8$ thus preventing it from cooling off. Moreover, the additional current supplied through $R_8$ helps to keep $SCR_1$ in a conducting mode until the cycle voltage has decreased almost to zero.

The circuit of FIGURE 2 has been successfully operated with the component values indicated.

Thus the present invention provides an improved voltage regulator where a predetermined value of voltage across a load is maintained by terminating a rectified voltage at a predetermined time. Moreover, a predetermined root mean square value of voltage across an illuminating lamp is maintained by means of a shaping circuit which provides for the nonlinear characteristic introduced by the root mean square function. It should be understood, of course, that the invention is also applicable to many other situations where a different type of nonlinear function may be introduced.

We claim:
1. A control circuit for maintaining the effective voltage of an AC signal applied across a load at a predetermined value comprising:
  a rectifier having a pair of output terminals for providing a rectified signal waveform;
  a load;
  a switch;
  means connecting said switch and said load in series across the output terminals of said rectifier;
  circuit means connected between said rectifier and said switch for closing said switch substantially at the beginning of each half cycle of the rectified signal to thereby couple the rectified signal to the load;
  shaping means connected to said rectifier for providing an output signal having an amplitude which is sub- stantially a function of the square of the magnitude of the rectified signal;

voltage sensing means connected to said shaping means to provide a gating signal upon the occurrence of a predetermined voltage level; and means responsive to said gating signal to open said switch during a predetermined time in each half cycle of said rectified signal to maintain the effective value of the voltage impressed across the load substantially at a predetermined value.

2. A control circuit as claimed in claim 1 wherein said voltage sensing means comprises:

a capacitor connected in circuit with said shaping means; and a unijunction transistor having a pair of base electrodes and an emitter electrode, said base electrodes being connected in circuit across the output terminals of said rectifier and said emitter electrode being connected between said capacitor and said shaping means.

3. A control circuit as claimed in claim 2 including in addition:

means for providing a predetermined base voltage on said capacitor to thereby regulate the magnitude of the rectified signal waveform necessary to trigger the unijunction transistor.

4. A control circuit as claimed in claim 1 wherein said switch comprises a first controlled rectifier having anode, cathode and gate terminals, said anode and cathode terminals being connected in series with said load and said gate terminal being connected to said means for closing said switch.

5. A control circuit as claimed in claim 4 wherein said means for opening said switch at a predetermined time in each half cycle of said rectified signal waveform comprises a second controlled rectifier having anode, cathode and gate terminals, said anode and cathode terminals being connected in circuit with said switch and said gate terminal being connected to said voltage sensing means.

6. A control circuit as claimed in claim 1 wherein said shaping means comprises a current limiting impedance connected in series with said voltage sensing means and means connected in parallel with at least a portion of said current limiting impedance for shorting out said portion when the rectified signal waveform reaches a predetermined voltage level.

7. A control circuit as claimed in claim 6 wherein said current limiting impedance comprises a pair of serially connected resistors and said shorting means comprises a Zener diode connected in parallel with one of said resistors.

8. A control circuit as claimed in claim 1 wherein said voltage sensing means includes an integrating means connected to said shaping means.

9. A control circuit as claimed in claim 8 wherein said voltage sensing means includes in addition a unijunction transistor having at least two base electrodes and an emitter electrode, said emitter electrode connected between said circuit means and said integrating means, said base electrodes being connected in circuit across said rectifier output terminals and one of said base electrodes being connected to said switch opening means.

10. A control circuit for regulating the effective value of an AC signal generated by an AC signal source and applied to a load comprising:

a first controlled rectifier having anode and cathode terminals connected in series with the load, and a gate terminal connected to the AC signal source so that the first controlled rectifier is triggered at the beginning of each half cycle of the AC signal being regulated;

a second controlled rectifier having anode, cathode and gate terminals, said second controlled rectifier being connected in parallel with said first controlled rectifier, a shaping means connected to the AC signal source for providing an output signal having an amplitude which is proportional to substantially the square of the amplitude of the AC signal, a capacitor connected in series with said shaping means;

a unijunction transistor having a pair of base electrodes and an emitter electrode, said base electrodes being connected across said AC signal source and said emitter electrode being connected between said shaping means and said capacitor whereby said unijunction transistor provides a gating pulse when the signal provided by said shaping means reaches a predetermined voltage level, and means for connecting said gating pulse to the gate terminal of said second silicon controlled rectifier to trigger said second controlled rectifier and switch off said first controlled rectifier during a predetermined time in each half cycle of the AC signal to regulate the effective value of the voltage impressed across the load.

References Cited

UNITED STATES PATENTS

| 3,243,605 | 3/1966 | Smith et al. | |
| 3,256,448 | 6/1966 | Ogawa et al. | |
| 3,281,638 | 10/1966 | Crawford | 321—16 X |
| 3,307,042 | 2/1967 | Fogleman. | |
| 3,353,082 | 11/1967 | Mellott et al. | 321—16 |

JOHN F. COUCH, *Primary Examiner.*

A. D. PELLINEN, *Assistant Examiner.*

U.S. Cl. X.R.

315—200, 225; 321—47; 323—22, 38